(12) United States Patent
Lin (10) Patent No.: US 7,494,224 B2
(45) Date of Patent: Feb. 24, 2009

(54) LECTURE PRESENTATION SYSTEM

(76) Inventor: William Lin, 1860, Fumia Pl., San Jose, CA (US) 95131

( * ) Notice: Subject to any disclaimer, the term of this patent is extended or adjusted under 35 U.S.C. 154(b) by 445 days.

(21) Appl. No.: 11/258,528

(22) Filed: Oct. 26, 2005

(65) Prior Publication Data

US 2007/0091282 A1      Apr. 26, 2007

(51) Int. Cl.
*G03B 21/14* (2006.01)
(52) U.S. Cl. .............. 353/28; 359/443; 353/98
(58) Field of Classification Search .......... 353/98, 353/99, 62, 74, 75, 77, 79, 97; 359/443, 359/449, 459
See application file for complete search history.

(56) References Cited

U.S. PATENT DOCUMENTS

| | | | | |
|---|---|---|---|---|
| 2,132,904 A | * | 10/1938 | Martinez et al. | 359/446 |
| 5,080,481 A | * | 1/1992 | Martin et al. | 353/122 |
| 5,373,333 A | * | 12/1994 | Kawada et al. | 353/122 |
| 5,477,282 A | * | 12/1995 | Moore | 352/4 |
| 5,620,245 A | * | 4/1997 | Kobayashi et al. | 353/28 |
| 6,280,039 B1 | * | 8/2001 | Barber | 353/119 |
| 2006/0250692 A1 | * | 11/2006 | Peterson et al. | 359/443 |

* cited by examiner

*Primary Examiner*—William C. Dowling
(74) *Attorney, Agent, or Firm*—Bacon & Thomas, PLLC (57) ABSTRACT

A lecture presentation system includes a display screen and a projector for projecting an image onto the display screen. The display screen has image-receiving strip members linked to one another for receiving the image projected from the projector and an open space between each two adjacent strip members. Another lecture presentation system disclosed by the present invention includes a display screen for displaying an image. The display screen is formed of strip-like LCDs (liquid crystal displays) coupled to one another and respectively spaced from one another by an open space.

16 Claims, 7 Drawing Sheets

LECTURE PRESENTATION SYSTEM

BACKGROUND OF THE INVENTION

1. Field of the Invention

The present invention relates to a lecture presentation system and more particularly, to such a lecture presentation system, which enables the lecturer to see the content of the written texture of the speech without blocking the audiences' sight from viewing the lecturer.

2. Description of the Related Art

When making a speech in a public place, the lecturer may hold the written texture of the speech in hand or keep the written texture of the speech in a sheet rack at the top of the lecturer's desk so that the lecturer can review the content of the written texture of the speech when necessary.

When a lecturer using a written texture to make a speech, all the words of the written texture are mapped onto the lecture's sight, and the lecture may be unable to catch the words from the written texture or omit some words in the written texture. Further, the font size of the written texture is not freely adjustable. In order to prevent a mistake, the lecture may make the speech by reading the written texture word by word. This is to deliver a recitation but not to make a speech.

Further, when making a speed in a hall, a classroom, a workplace, airport, plaza, or any of a variety of outdoor places, the written texture may be blown by the wind or the currents of air from an electric fan, or wetted by rainwater, causing an interruption of the speech.

Further, in order to make the speech vivid, the lecturer has to frequently change the view angle from one audience to another, to look about the surroundings, to use the body languages and then return the sight of the eyes to the written texture of the speech. At this time, the lecturer may spend a lot of time in searching the words, resulting in an awkward silence, interruption of the speech, or even failure of the lecture.

Therefore, it is desirable to provide a lecture presentation system that eliminates the aforesaid problems.

Further, because the lecture usually stands by one side of the lecturer's desk whiling giving the speech to the audiences, the lecture presentation system must have a limited size and weight so that the use of the lecture presentation system does not block the audiences' sight from viewing the lecturer or attract the audiences' attention.

SUMMARY OF THE INVENTION

The present invention has been accomplished under the circumstances in view. It is therefore the main object of the present invention to provide a lecture presentation system, which enables the lecturer to see the content of the written texture of the speech without blocking the audiences' sight from viewing the lecturer.

According to one embodiment of the present invention, the lecture presentation system comprises a display screen and a projector for projecting an image onto the display screen. The display screen comprises a plurality of image-receiving strip members linked to one another for receiving the image projected from the projector and an open space between each two adjacent strip members.

According to another embodiment of the present invention, the lecture presentation system comprises a display screen for displaying an image. The display screen is comprised of a plurality of strip-like LCDs (liquid crystal displays) that are coupled to one another and respectively spaced from one another by an open space.

According to the present invention, the projector projects the image of the written texture of the speech onto the display screen, or the image of the written texture of the speech is directly displayed on the strip-like LCDs of the display screen. The structure of the lecture presentation system is simple. The display screen can be formed of strip members that receive the image projected from the projector, and are coupled to one another with an open space left between each two adjacent strip members. When viewing from the side of the audiences, the sight line passes through the open space between the thin lateral sides of each two adjacent strip members, i.e., the presence of the strip members of the display screen is insignificant to the audiences, and the audiences can see the lecturer through the open spaces in between the strip members. When viewing from the side of the lecturer, one can see the planar surface area of each strip member, and the planar surface areas of the strip members show almost a full screen that receives the image projected from the projector. Although each strip member receives only a part of the image projected from the projector, the lecturer can see the image in whole from the strip members. Further, because the display screen is set in front of the lecturer without blocking the audiences from seeing the lecturer, the lecturer can talk to the audiences without lowering the head to search the written texture of the speech, i.e., the lecturer can make a vivid speech and interact with the audiences when making the speech. Further, the content of the projection of the projector can be separately controlled to match with the lecturer's speech.

In conclusion, the invention provides a lecture presentation system, which has a simple structure, and enables the lecturer to see the content of the written texture of the speech leisurely without much effort and to make the speech lively.

DETAILED DESCRIPTION OF THE INVENTION

Figure 1:
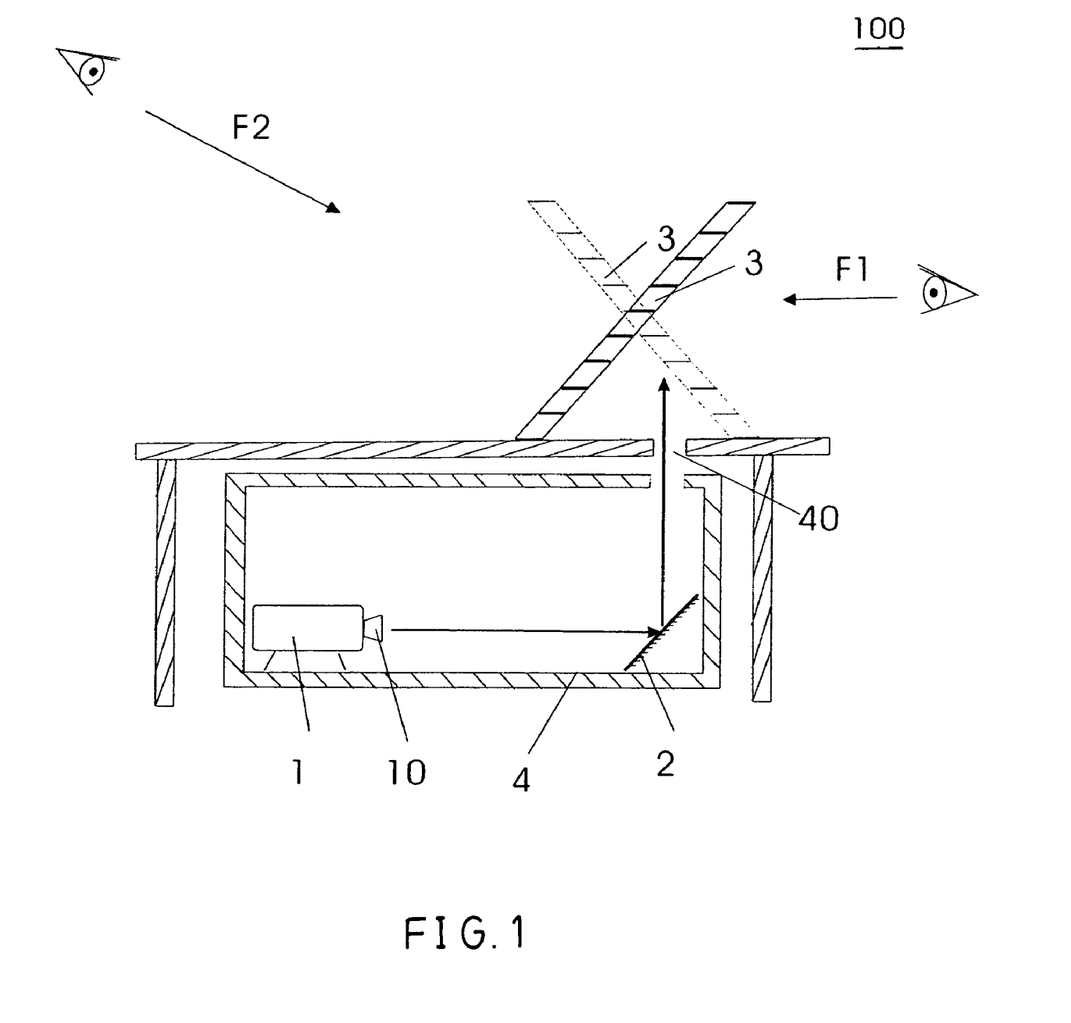
FIG. 1 is a schematic drawing of a lecture presentation system according to a first preferred embodiment of the present invention.

Referring to FIG. 1, a lecture presentation system 100 in accordance with the present invention is shown comprising an image projection means 1, a lens set 2, a display screen 3, and a box 4. The image projection means 1 and the lens set 2 are mounted inside the box 4, which is set beneath the lecturer's desk. Alternatively, the image projection means 1 and the lens set 2 can be directly mounted inside the lecturer's desk. The display screen 3 is provided at the top side of the lecturer's desk. The image projection means 1 projects a light beam, and the lens set 2 reflects the light beam onto the display screen 3, thereby forming an image on the display screen 3. Alternatively, the lecture presentation system 100 can be an independent system.

The image projection means 1 can be a projector, electronic system-driven CRT monitor or LCD monitor, slide projector, real object, or manuscript for enabling the image of the content of the lecture to be projected onto the display screen 3. According to this embodiment, the image projection means 1 is a projector, which is electrically connected to a computer that has the content of the lecture stored therein. By means of the operation of the computer, the content of the lecture is projected onto the display screen 3 through the projector 1.

According to this embodiment, the projector 1 is horizontally mounted inside the box 4. The lens set 2 is set inside the box 4 at a predetermined angle relative to the lens 10 of the projector 1 for reflecting the light beam outputted from the projector 1 onto the display screen 3 to form an image on the back or front side of the display screen 3. At this time, the display screen 3 is in the position of the real image shown in FIG. 1. Alternatively, the lens set 2 can be omitted, and the projector 1 is set to directly project the image onto the display screen 3.

The projector 1 can be set in vertical inside the box 4, allowing the projected light to pass to the display screen 3 or reflected onto the display screen 3 by the lens set 2, thereby forming an image on the front or back side of the display screen 3. At this time, the display screen 3 is in the position of the virtue image shown in FIG. 1. This projector 1 arrangement can omit the lens set 2, enabling the projector 1 to project the image onto the display screen 3 directly.

If the projector 1 is set to project light onto the display screen 3 to further form an image on the back side of the display screen 3, the display screen 3 can be made of a photographic material that allows light to pass to the back side, and the lecturer can see the content of the image from the top side. Either of the aforesaid two methods for forming an image on the display screen enables the lecturer to see the image clearly. The written texture of the speech in the projector 1 is set on the right side if the projector 1 is arranged to have the image be projected onto the front side of the display screen 3, or on the reverse side if the projector 1 is set to have the image be projected onto the back side of the display screen 3.

The lens set 2 can be formed of a plurality of reflectors including reflection lens, planar mirror, and curved mirror. The lens set 2 changes the direction of light projected from the projector 1, thereby increasing the space distance between the lens of the projector 1 and the display screen so as to obtain a relatively bigger projection image. An optical system such as lens assembly or curve mirror may be used so as to obtain a relatively greater projection image in a relatively smaller space distance. Therefore, the image projected onto the display screen 3 is large and clear enough, and the lecturer can identify the image without effort.

Figure 2:
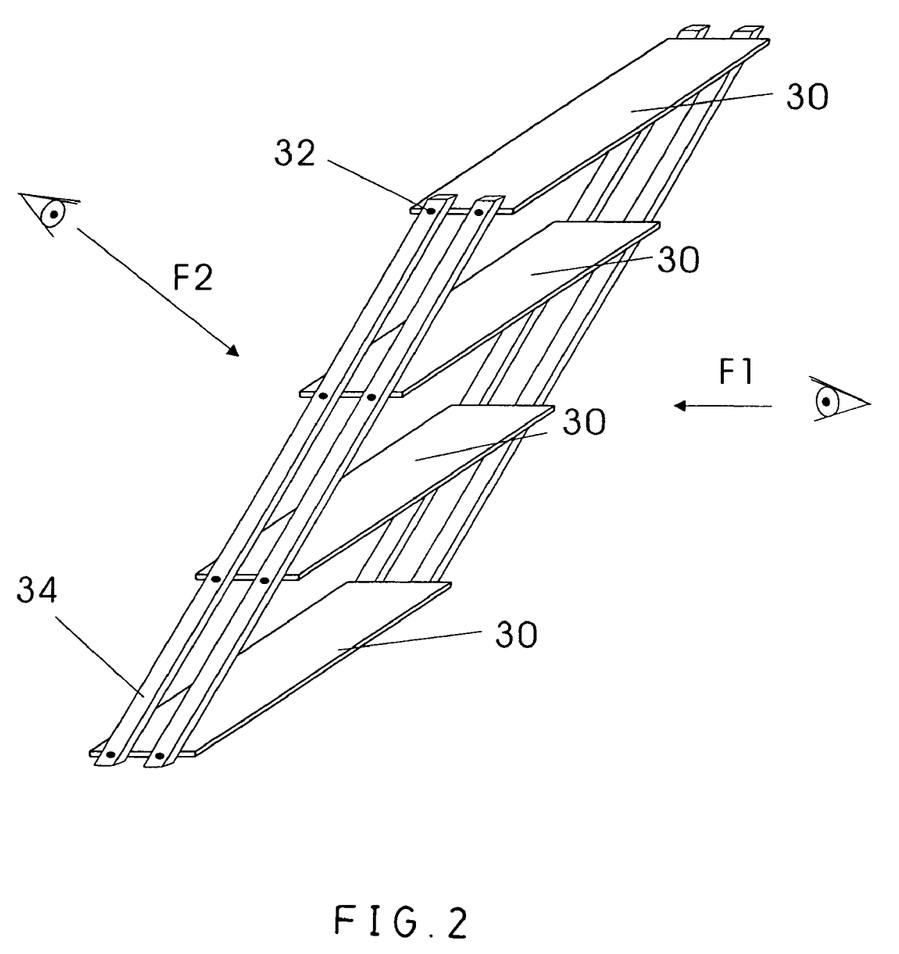
FIG. 2 is a perspective view of the display screen for the lecture presentation system according to the present invention.

Referring to FIG. 2 and FIG. 1 again, the display screen 3 is set at the top of the lecturer's desk, comprised of a plurality of spaced strip members 30. The strip members 30 can be strip-like lenses, screens, or LCDs (Liquid Crystal Displays). The strip members 30 can be arranged like the slats of a Venetian blind so that they can be adjusted to the desired angle. The strip members 30 are thin members having a predetermined width. The strip members 30 are linked together, and a space is left between each two strip members 30. The strip members 30 each have a thin side facing the audiences so that the presence of the strip members 30 is insignificant to the audiences, and the audiences can see the lecturer through the spaces in between the strip members 30. Because of a different view angle, the lecturer can see the planar surface area of each strip member 30, and the planar surface areas of the strip members 30 show almost a full screen that receives the whole image projected from the projector. Although each strip member 30 receives only a part of the image projected from the projector, the lecturer can see the image in whole from the strip members 30.

The strip members 30 can be made out of metal or non-metal material, having a planar, arched or curved surface or their combination. The side of each strip member 30 that receives the projection from the projector can be a reflective, opaque or translucent surface, a frosted glass, or a film-coated surface, the screen of a cinema or the front screen of a rear projection TV.

The connection and support of the strip members 30 can be achieved by means of either of the following measures:

1. The strip members 30 each have a plurality of mounting holes (not shown) symmetrically arranged on the two distal ends thereof, and links 34 are fastened to the mounting holes of the strip members 30 with pivot screws 32 to hold the strip members 30 in parallel. By means of operating the links 34, the tilt angle of the strip members 30 is adjusted.

2. The strip members 30 can be made to form a Venetian blind. This method is easy to achieve with the use of a mold or through a simple assembly process.

3. Clamping plates may be bonded to the strip members 30, or screws or other connecting or fastening means may be used to connect the strip members 30 together.

4. Each two strip members 30 may be fastened together by edge fixation.

Further, spring means may be used to facilitate adjustment of the tilt angle of the strip members 30, reducing the interference of the presence of the strip members 30 to the audience's line of vision. Adjustment can be achieved by means of a simple manual design. Alternatively, an electronic circuit-controlled mechanical adjustment device may be used.

The display screen 3 is constructed to have the separated parts of an image be viewed in whole in a specific angle.

Figure 3A:
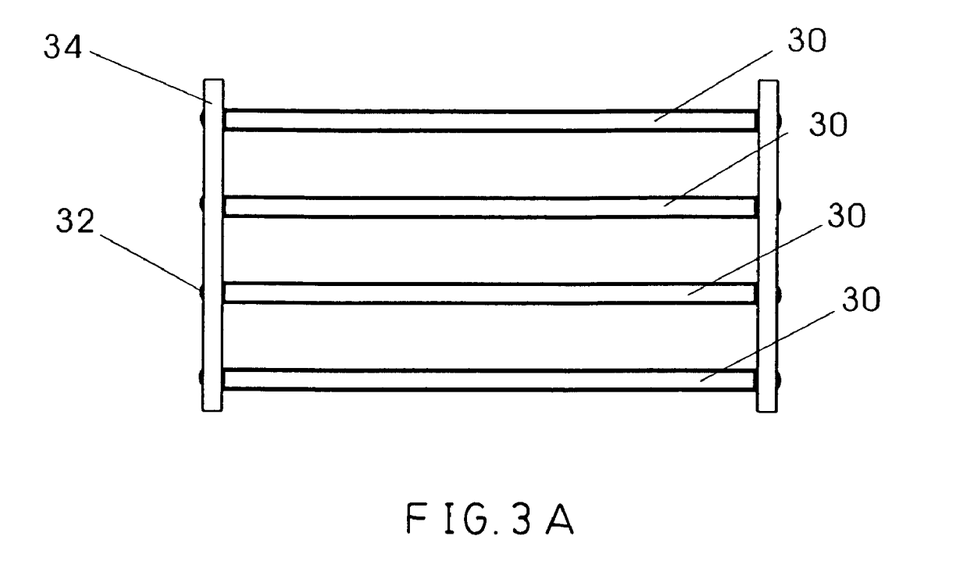
FIG. 3A is a schematic plain view of the display screen viewed from the audiences' view angle F1 according to the present invention.

Referring to FIG. 3A and FIGS. 1 and 2 again, when the audience directs his (her) view angle F1 toward the lecturer, the audience's view angle F1 faces the thin side of each of the strip members 30, therefore the thin side of each of the strip members 30 does not obstruct the audience's line of vision, i.e., the audience can see the lecturer but will not see the image projected onto the display screen.

Figure 3B:
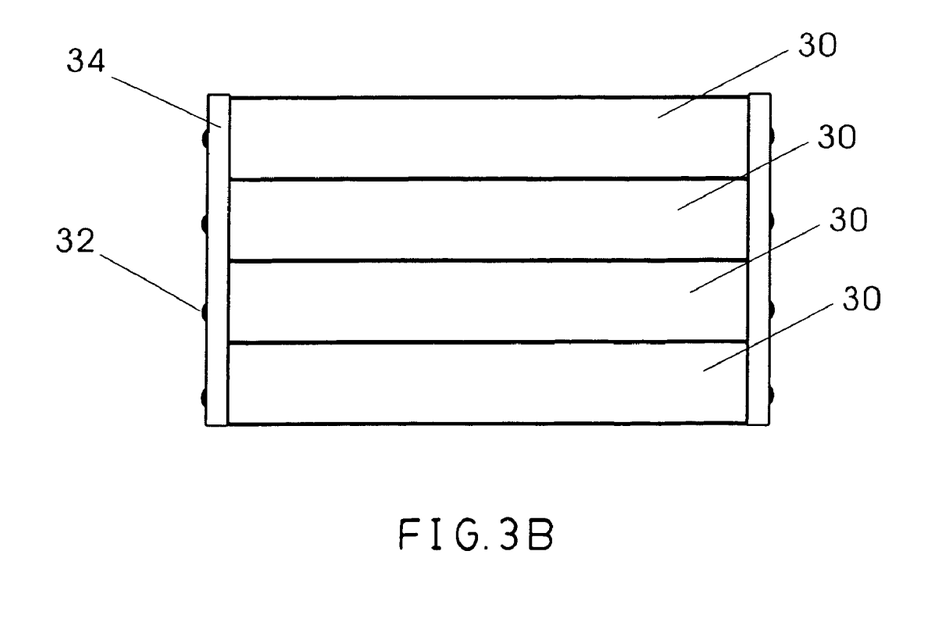
FIG. 3B is a schematic plain view of the display screen viewed from the lecturer's view angle F2.

Referring to FIG. 3B and FIGS. 1 and 2 again, when the lecturer directs the view angle F2 toward the display screen, the view angle F2 faces the planar surface area of each of the strip members 30. In this angle, the planar surface areas of the strip members 30 form one screen surface for the display of the whole image, and therefore the lecture can see the whole image projected from the projector 1.

The display screen is set in front of the lecturer so that the lecture can see the image projected onto the display screen without lowering the head while facing and talking to the audiences. Therefore, the lecturer can interact with the audience while making a vivid speech to the audiences.

Figure 4:
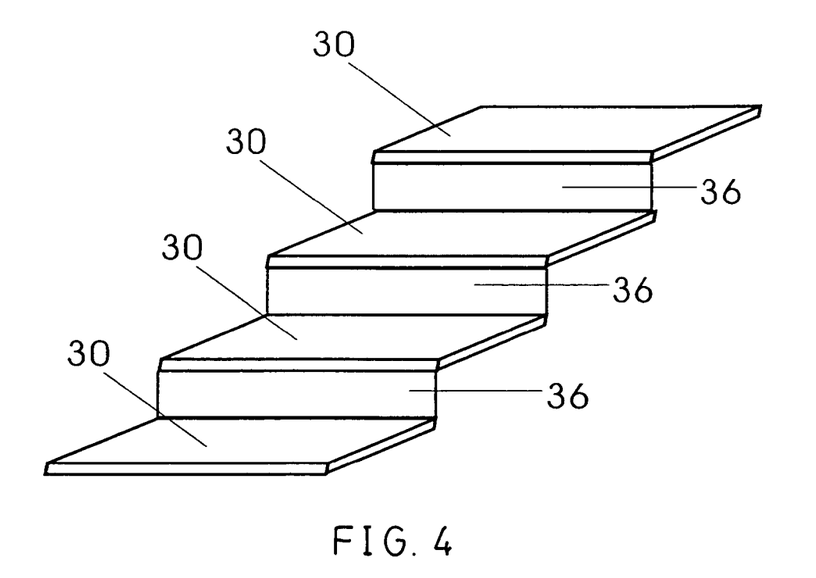
FIG. 4 is a perspective view of an alternate form of the display screen for the lecture presentation system according to the present invention.

Referring to FIG. 4, lenses 36 that admit light may be respectively connected between each two adjacent strip members 30 at a predetermined angle relative to the strip members 30. The structure is similar to a fan. The strip members 30 are same as the embodiment shown in FIG. 2. Further, the lens 36 can be coated with a translucent film or made in the shape of a frame. The side facing the lecturer may be frosted or covered with a cloth or plastic covering for receiving the image of a projection. When the lecturer directs the view angle F2 toward the display screen, the lecturer can see the whole image on the display screen as shown in FIG. 3.

During working, the display screen 3 is in an open status, i.e., the strip members 30 are spread out like the open status of a fan. When not in use, the display screen 3 is received like the receiving operation of a fan. The received display screen 3 can be kept in the box 4 convenient for carrying. This display screen structure may be made in a fixed type and constantly kept in shape.

The lateral side of each strip member 30 of the display screen 3 is a thin side, which still has a certain thickness. The lateral side of each strip member 30 may be processed to provide a decorative pattern or marked with a company or organization's logo for advertising purpose.

Referring to FIG. 1 again, the box 4 is a container, having a holding space for keeping the projector 1 and the lens set 2. The box 4 has a top through hole 40 for the passing of light. Through the through hole 40, the les set 2 reflects the light from the projector 1 onto the display screen 3. The display screen 3 may be affixed to the box 4.

During installation, the projector 1 is mounted inside the box 4, and then the lens set 2 is mounted inside the box 4 corresponding to the top through hole 40 for enabling the lens set 2 to reflect light from the projector 1 out of the top through hole 40 of the box 4. At final, the display screen 3 is installed in a suitable place so that the display screen 3 can receive the light reflected from the projector 1 by the lens set 2. Alternatively, the projector 1, the lens set 2 and the display screen 3 may be incorporated into a single unit that can be extended out when in use. Thus, this lecture presentation is easy to install for convenient use.

Referring to FIG. 1 again, when in use, turn on the projector 1 to have the image of the written texture of the speech be projected onto the lens set 2 and reflected by the lens set 2 onto the front side of the display screen 3. If the display screen 3 is in the position of the real image shown in FIG. 1, the right side image is projected onto the front side of the display screen 3. On the contrary, the reverse side image is projected onto the back side of the display screen 3 if the display screen 3 is in the position of the virtue image shown in FIG. 1. The lecturer stands in front of the front side of the display screen 3, and can see the right side image on the front side of the display screen.

If the image is not clear, adjust the focal length of the projector 1 or the lens set 2 until the image is clearly shown on the display screen 2. The tilt angle of the strip members 30 of the display screen 3 can also be adjusted to suit the lecture or audiences' view angle so that the display screen 3 is seen in the form of spaced lines from the audiences' view angle, or in a continuous screen from the lecturer's view angle.

As indicated above, the lecture presentation system 100 is set at the front side of the lecturer's view angle so that the lecturer can read the content of the written texture of the speech leisurely and interact with the audiences, making the speech vivid.

The elevation of the display screen 3 of the lecture presentation system 100 is adjustable to suit the lecturer's body height. If the image is not clear after adjustment of the elevation of the display screen 3, adjust the focal length of the projector 1 and/of the lens set 2 until a clear image is obtained.

In addition to the aforesaid embodiment, the lecture presentation system 100 may be in any of a variety of other forms without departing from the spirit and scope of the invention.

Figure 5:
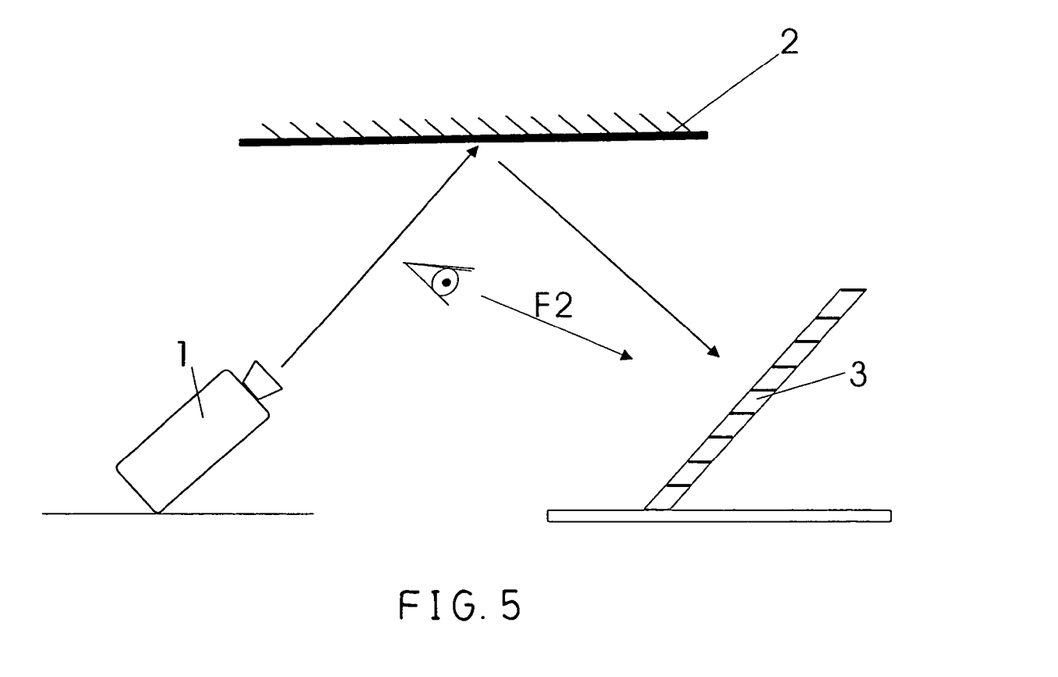
FIG. 5 is a schematic drawing showing the operation of a lecture presentation system according to a second preferred embodiment of the present invention.

According to the second embodiment shown in FIG. 5, the lecture presentation system 100 comprises an image projection means 1, a lens set 2, and a display screen 3. The image projection means 1, the lens set 2 and the display screen 3 can be same as the like parts shown in FIGS. 1-4.

According to this embodiment, the image projection means 1 can be installed in any place with the projecting lens thereof aimed at the lens set 2. The lens set 2 can be installed in the ceiling or an overhead place to reflect the projected light from the image projection means 1 onto the display screen 3, which is set in a suitable place where the lecturer can see.

According to this embodiment, the image projection means 1 can be set in front or behind the display screen 3, and the lens set 2 can be set in any place to reflect the projected light from the image projection means 1 onto the display screen 3. The written texture of the speech is set on the right side so that the image of the written texture of the speech can be projected onto the front side of the display screen 3. Alternatively, the written texture of the speech is set on the reverse side, enabling the image of the written texture of the speech to be projected onto the back side of the display screen 3. In this case, the display screen must be made of a suitable material that allows the projected light to pass through the back side.

Figure 6:
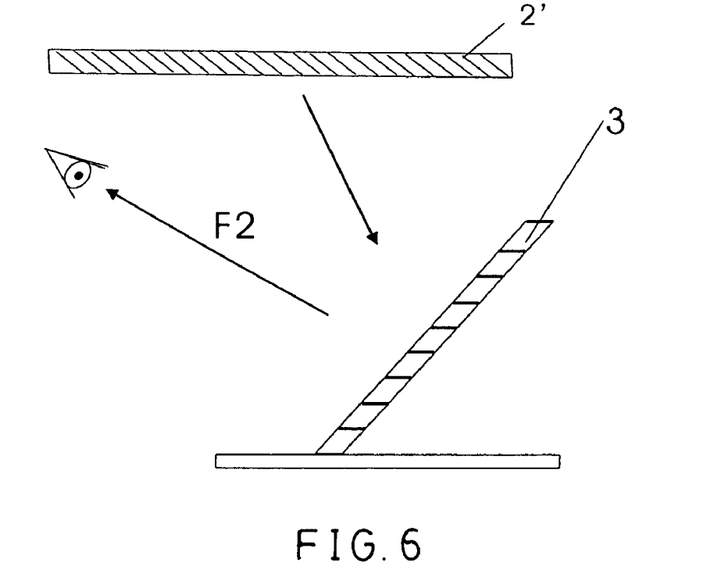
FIG. 6 is a schematic drawing showing the operation of a lecture presentation system according to a third preferred embodiment of the present invention.

According to the third embodiment shown in FIG. 6, the lecture presentation system 100 comprises an image projection means 1 (not shown), a graphic screen 2', and a display screen 3'. The graphic screen 2' can be a screen for showing subtitle, video screen TV, monitor, or real object. The display screen 3 is comprised of multiple strip-like lenses that reflect the content of the graphic screen 2'. Through the display screen 3, the lecturer can see the content of the graphic screen 2'. The graphic screen 2' can be installed in any place corresponding to the display screen 3, allowing the lecturer to see the content of the graphic screen 2' through the display screen 3.

Figure 7:
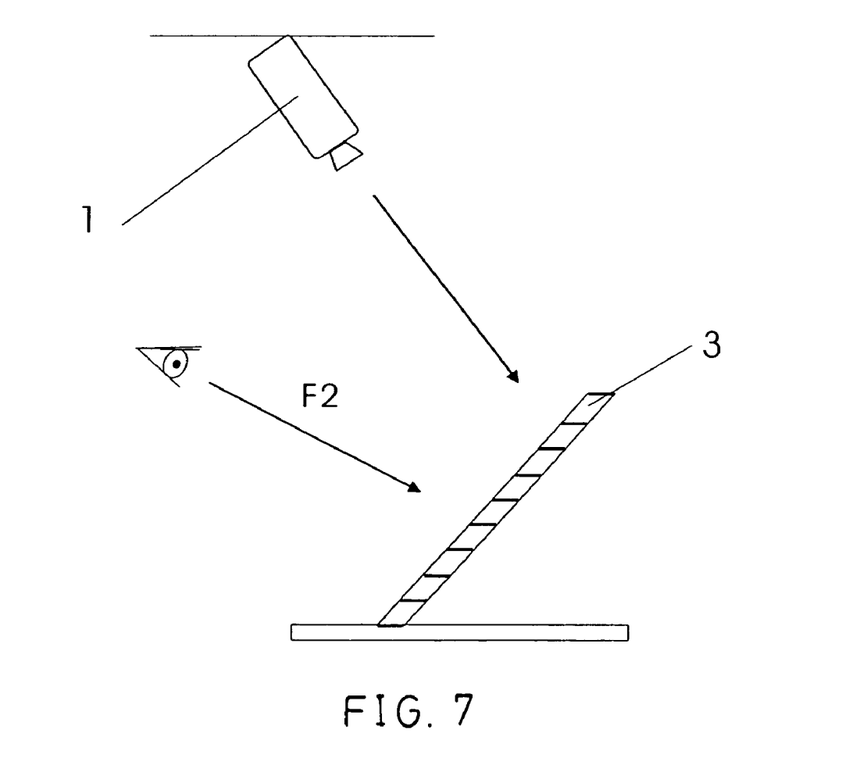
FIG. 7 is a schematic drawing showing the operation of a lecture presentation system according to a fourth preferred embodiment of the present invention.
Figure 8A:
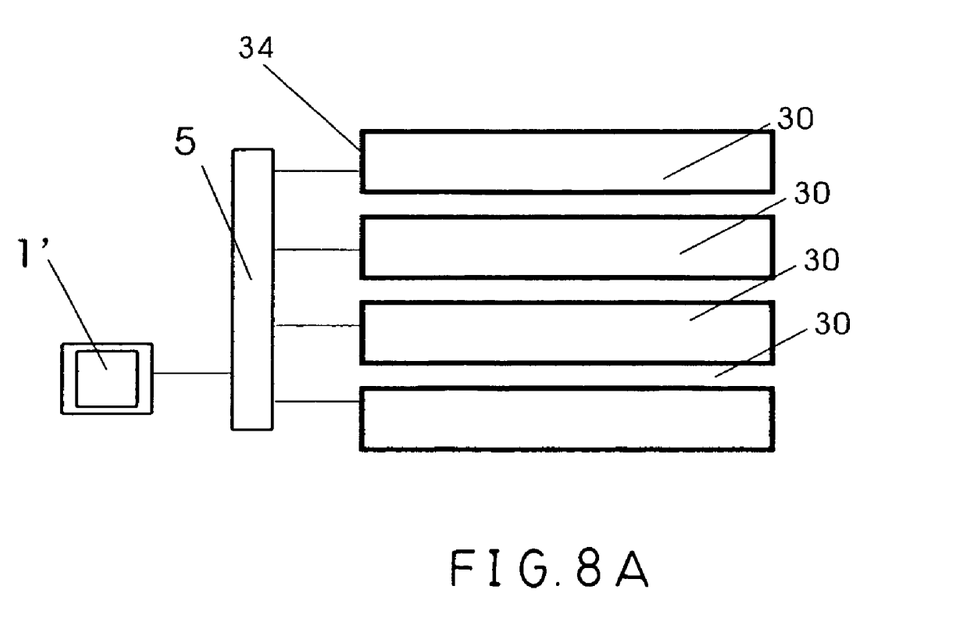
FIG. 8A is a schematic drawing of a lecture presentation system according to a fifth preferred embodiment of the present invention.
Figure 8B:
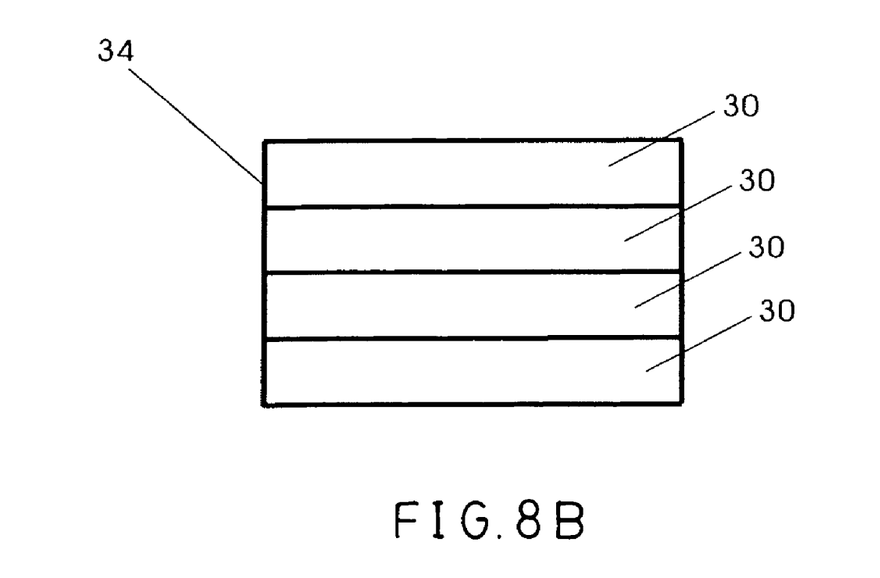
FIG. 8B is another schematic drawing of a lecture presentation system according to a fifth preferred embodiment of the present invention.
Figure 8C:
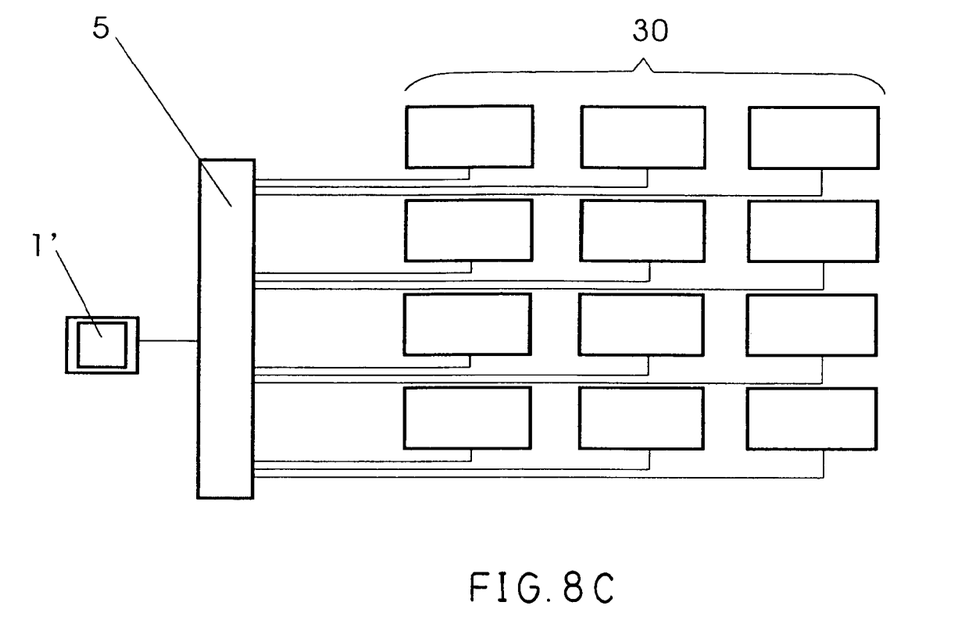
FIG. 8C is still another schematic drawing of a lecture presentation system according to a fifth preferred embodiment of the present invention.
Figure 8D:
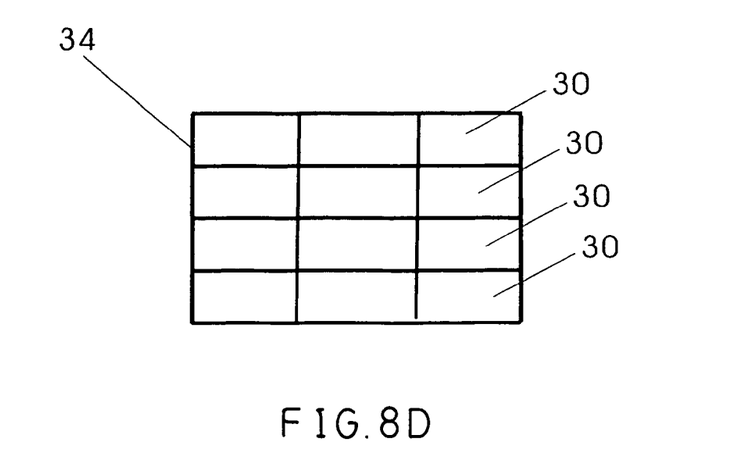
FIG. 8D is still another schematic drawing of a lecture presentation system according to a fifth preferred embodiment of the present invention.

According to the fourth embodiment shown in FIG. 7, the lecture presentation system 100 comprises an image projection means 1 and a display screen 3. This embodiment omits the aforesaid lens set 2, and the image projection means 1 directly projects the image onto the display screen 3.

According to this fourth embodiment, the image projection means 1 is set above the display screen 3. For example, the image projection means 3 can be installed in the ceiling, the wall, or an overhead bracket, and controlled to project the image of the written texture of the speech onto the display screen 3. Similar to the first embodiment shown in FIG. 1, the angle of the display screen 3 is adjustable subject to the lecturer's requirement.

As indicated above, the lecture presentation system 100 uses an image projection means 1 to protect the image of the written texture of the speech onto the display screen 3, and a lens set 2 can be set in the light path between the image projection means 1 and the display screen 3. The relative positions of the image projection means 1, the display screen 3 and the lens set 2 are adjustable to fit different requirements, allowing the image of the written texture of the speech to be clearly shown on the display screen 3. This lecture presentation system 100 allows the lecturer to see the content of the speech leisurely without staring at remembering the written texture of the speech, and therefore, the lecturer can make the speech lively.

According to the fifth embodiment shown in FIGS. 8A-8D, the display screen 3 of the lecture presentation system 100 is comprised of multiple strip-like LCDs (Liquid Crystal Displays). A holder frame may be used to hold the strip-like LCDs of the display screen 3 in place. Each LCD of the display screen 3 displays a part of the image. The strip-like LCDs form one full screen. A distributor 5 is electrically connected between a computer system 1' and the strip-like LCDs of the display screen 3. The distributor 5 equally distributes the full image into the strip-like LCDs evenly so that the strip-like LCDs show the full image.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lecture presentation system comprising a display screen for displaying an image, wherein said display screen comprises a plurality of strip-like liquid crystal displays (LCDs) coupled to one another and spaced from one another by an open space.

2. The lecture presentation system as claimed in claim 1, wherein said strip-like LCDs are held in a holder frame.

3. The lecture presentation system as claimed in claim 2, further comprising a computer system and a distributor electrically connected between said computer system and said strip-like LCDs for evenly distributing an image outputted from said computer system to said strip-like LCDs.

4. The lecture presentation system as claimed in claim 1, wherein said display screen is formed by a plurality of strip members arranged in the form of a Venetian blind.

5. The lecture presentation system as claimed in claim 4, wherein said strip members are folding collapsible.

6. The lecture presentation system as claimed in claim 5, wherein said strip members each have a predetermined width, a thin lateral side, and one side facing the lecturer for showing the image.

7. The lecture presentation system as claimed in claim 6, wherein said strip members can be made of metal or nonmetal material, having a planar, arched or curved surface or their combination, and the side of each of said strip members that faces the lecturer for showing the image can be a reflective, opaque or translucent surface, a frosted or translucent glass, or a film-coated surface.

8. The lecture presentation system as claimed in claim 7, wherein said strip members each have a mounting hole in each of two distal ends thereof.

9. The lecture presentation system as claimed in claim 8, wherein a frame is connected to the two distal ends of each of said strip members, said frame has through holes corresponding to the mounting holes on the two distal ends of each of said strip members.

10. The lecture presentation system as claimed in claim 9, further comprising a plurality of fasteners respectively mounted in the through holes of said frame and the mounting holes of said strip members to secure said frame to said strip members.

11. The lecture presentation system as claimed in claim 7, wherein said strip members are fastened together to form a Venetian blind by means of molding or bonding or the use of a supporting member.

12. The lecture presentation system as claimed in claim 10, further comprising springs respectively mounted on said fasteners between the mounting holes of said strip members and the through holes of said frame for enabling said strip members to be adjusted to the desired tilt angle.

13. The lecture presentation system as claimed in claim 12, wherein the lateral side of each of said strip member is embossed or marked with a logo.

14. The lecture presentation system as claimed in claim 7, wherein said display screen further comprises a plurality of light-penetrable lenses or frames respectively connected between each two adjacent strip members at a predetermined angle.

15. The lecture presentation system as claimed in claim 14, wherein said light-penetrable lenses are respectively coated with a light-penetrable film; said strip members of said display screen each have one side thereof coated with a light-penetrable film and facing the audiences, and an opposite side thereof frosted or covered with a fabric or plastic covering and facing the lecturer.

16. The lecture presentation system as claimed in claim 15, wherein the connection area between one said strip member and the respective light-penetrable lens is embossed or marked with a logo.

* * * * *